US009819875B2

United States Patent
Seshadrinathan et al.

(10) Patent No.: US 9,819,875 B2
(45) Date of Patent: Nov. 14, 2017

(54) MULTI-CAMERA SYNC PULSE SYNCHRONIZATION

(71) Applicant: Intel Corporation, Santa Clara, CA (US)

(72) Inventors: Kalpana Seshadrinathan, Santa Clara, CA (US); Ramkumar Narayanswamy, Boulder, CO (US); Alexander N. Zaplatin, Santa Clara, CA (US); Joseph A. Hook, Pittsburgh, PA (US); Sheldon L. Sun, Portland, OR (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/635,614

(22) Filed: Mar. 2, 2015

(65) Prior Publication Data

US 2016/0261807 A1 Sep. 8, 2016

(51) Int. Cl.
*H04N 5/247* (2006.01)
*H04N 5/232* (2006.01)
*H04N 5/225* (2006.01)

(52) U.S. Cl.
CPC .......... *H04N 5/247* (2013.01); *H04N 5/2258* (2013.01); *H04N 5/232* (2013.01); *H04N 5/23206* (2013.01); *H04N 5/23229* (2013.01)

(58) Field of Classification Search
None
See application file for complete search history.

(56) References Cited

U.S. PATENT DOCUMENTS

| 7,292,271 | B2* | 11/2007 | Okano ............... H04N 5/222 348/218.1 |
| 7,333,725 | B1 | 2/2008 | Frazier |
| 2004/0017486 | A1 | 1/2004 | Cooper et al. |
| 2004/0257453 | A1* | 12/2004 | Lee ................ H04N 5/335 348/222.1 |
| 2005/0093982 | A1* | 5/2005 | Kuroki ............. H04N 3/1593 348/207.99 |

(Continued)

FOREIGN PATENT DOCUMENTS

KR 1020130044976 5/2013

OTHER PUBLICATIONS

Bennett Wilburn, Neel Joshi, Vaibhav Vaish, Eino-Ville Talvala, Emilio Antunez, Adam Barth, Andrew Adams, Mark Horowitz, and Marc Levoy. 2005. High performance imaging using large camera arrays. ACM Trans. Graph. 24, 3 (Jul. 2005), 765-776.

(Continued)

*Primary Examiner* — Twyler Haskins
*Assistant Examiner* — Wesley Chiu
(74) *Attorney, Agent, or Firm* — International IP Law Group, P.L.L.C.

(57) ABSTRACT

Techniques for image synchronization are described herein. The techniques may include a device having logic, at least partially including hardware logic, to implement modules. The modules may include a first sync pulse module to issue a first sync pulse after a first sync pulse offset period to a first imaging sensor. The modules may also include a second sync pulse module to issue a second sync pulse parallel to the first sync pulse after a second sync pulse offset period to a second imaging sensor.

20 Claims, 6 Drawing Sheets

(56) References Cited

U.S. PATENT DOCUMENTS

| | | | | |
|---|---|---|---|---|
| 2007/0030342 | A1* | 2/2007 | Wilburn | H04N 5/247 348/47 |
| 2008/0211941 | A1* | 9/2008 | Deever | H04N 5/2258 348/262 |
| 2011/0022872 | A1* | 1/2011 | Blancha | G06F 1/10 713/401 |
| 2011/0205381 | A1* | 8/2011 | Vranceanu | G06T 5/009 348/217.1 |
| 2011/0242341 | A1* | 10/2011 | Agrawal | G06T 3/4007 348/218.1 |
| 2012/0069407 | A1 | 3/2012 | Hasuo et al. | |
| 2014/0204182 | A1 | 7/2014 | Hewes et al. | |
| 2014/0270684 | A1* | 9/2014 | Jayaram | H04N 5/23238 386/224 |
| 2015/0278988 | A1* | 10/2015 | MacMillan | G06T 3/0068 348/218.1 |
| 2016/0014374 | A1* | 1/2016 | Van Woerdekom | H04N 19/40 348/14.08 |

OTHER PUBLICATIONS

International Search Report, PCT Application No. PCT/US2016/015585, dated May 19, 2016, 4 pages.

\* cited by examiner

300

400

MULTI-CAMERA SYNC PULSE SYNCHRONIZATION

TECHNICAL FIELD

This disclosure relates generally to synchronization techniques of image data in multi-camera systems. More specifically, the disclosure describes synchronization of image captures received from multiple cameras.

BACKGROUND

Computing devices increasingly include one or more cameras, or other types of image capture devices, to enable a user to capture images. For example, many smartphones and tablet computing devices include cameras operable to capture images in various scenarios. Some systems may include multiple cameras configured to capture image data within a common frame period. Synchronization of the image data may be important when combining multiple image data from different cameras to a common frame period.

DETAILED DESCRIPTION

The subject matter disclosed herein relates to techniques for synchronizing image data captured from multiple cameras in a multi-camera system. Cameras in a multi-camera system may include a heterogeneous configuration. For example, a first camera in the system may include an eight megapixel (MP) image sensor, while a second camera in the system may include an image sensor having less or more pixels. Characteristics, such as pixel count, aspect ratio, blanking periods, clock settings, and the like, of each image sensor in the system may affect the frame period of each image sensor. Different frame periods introduce errors in synchronizing each image capture from individual image sensors to a common frame period.

For example, if one camera has a frame period of 10 milliseconds (ms), and another camera has a period of 10.001 ms, the cameras would have one synchronization for the first frame, and the opposite synchronization for the 5000th frame (5000×(10.001 ms−10 ms)=5 ms). After another 5000 frames, the synchronization would return to the original synchronization, but one camera would be a whole frame behind. Matching the periods exactly means that every frame would have the same synchronization as every other frame. Only having a common frame period may not guarantee that the cameras will have a desired synchronization, or that the synchronization would be the same every time the cameras were turned on.

The techniques discussed herein include a mechanism to control the synchronization to produce a desired synchronization. As discussed in more detail below, sync pulses may be provided to multiple cameras including heterogeneous image sensors in order to synchronize the resulting image captures to a common frame period. In some cases, and synchronization may be selected having some amount of intentional skew, or offset, to enable a video capture speed that is effectively higher than a common frame rate of combined images.

A heterogeneous configuration may include two or more cameras having heterogeneous image sensors, or two or more cameras having similar or the same image sensors, but implemented with different configurations such as different integration times. Heterogeneous image sensors, as referred to herein, include image sensors having one or more different characteristics such as resolution, pixel count, aspect ratio, and the like.

Figure 1:
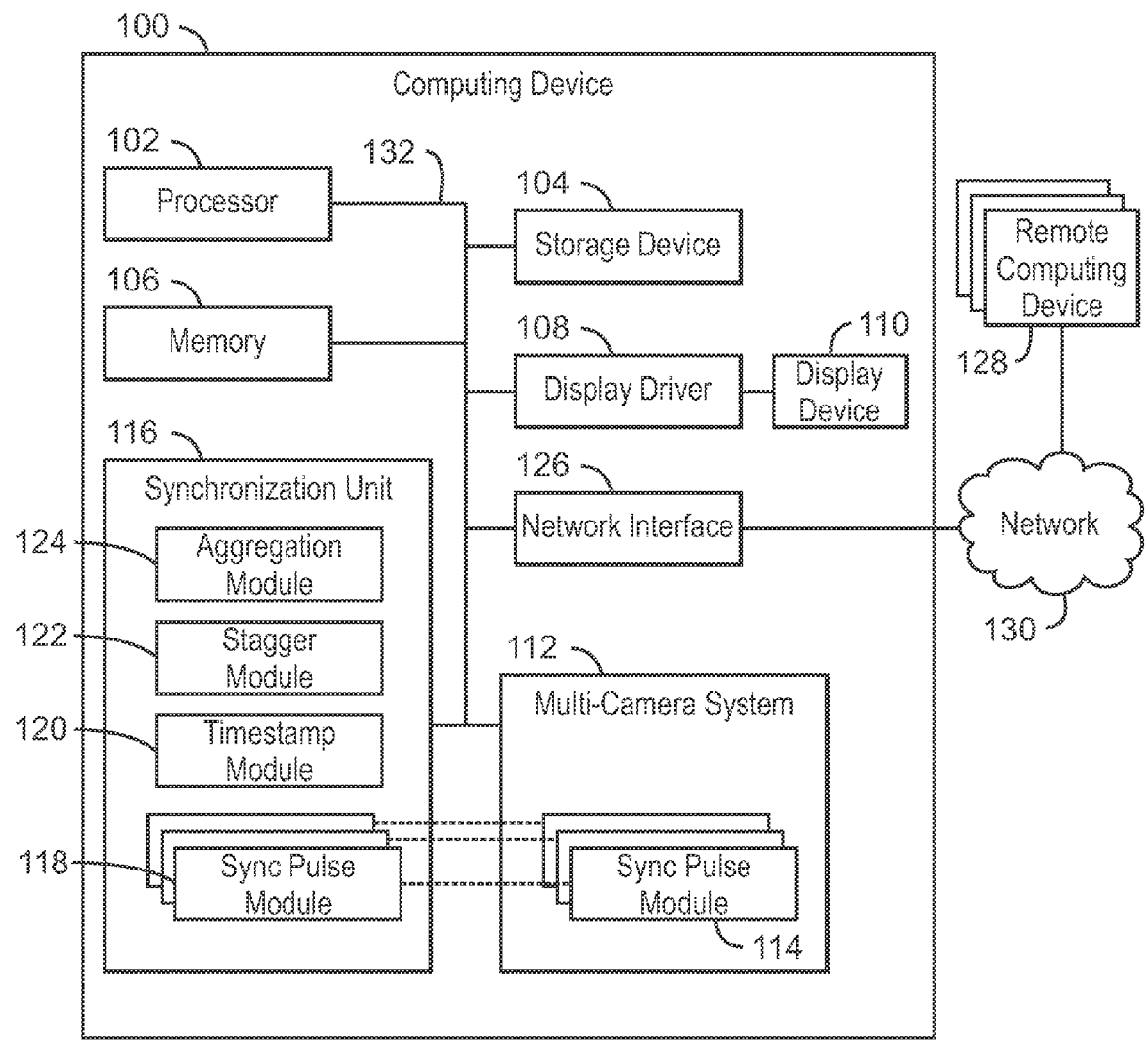
FIG. 1 is a block diagram of a computing device having an synchronization application to synchronize images at the computing device.

FIG. 1 is a block diagram of a computing device having a synchronization application to synchronize images at the computing device. The computing device 100 may include a processor 102, a storage device 104 including a non-transitory computer-readable medium, and a memory device 106. The computing device 100 may include a display driver 108 configured to operate a display device 110 to render images at a graphical user interface (GUI). The computing device 100 may also include a multi-camera system 112. The multi-camera system 112 may include multiple image sensors 114. In some cases, at least two of the image sensors 114 may be heterogeneous image sensors with respect to one another. The image sensors 114 provide a mechanism to control frame acquisition, such as a sync pulse. Frame acquisition begins after a deterministic delay, referred to herein as the capture delay, after the sync pulse. The capture delay may be a function of sensor configuration, such as the integration period, as long as it is deterministic for a given configuration. Exposure time, referred to herein as the integration period, may be specific to each type of image sensor used in a heterogeneous multi-camera system. The image sensors 114 may be either global shutter (the entire image is captured simultaneously) or electronic rolling shutter (rows of the image are captured sequentially). In the case of electronic rolling shutter, image capture is defined as a single point in time, such as the end of exposure time for the first row.

The computing device 100 includes modules of a synchronization unit 116 configured to synchronize images captured by one or more of the image sensors 114. The synchronization unit 116 may be a processing unit, such as a field programmable gate array (FPGA), or any other electronic logic, microprocessor, and the like configured to carry out operations of modules discussed in more detail below.

As illustrated in FIG. 1, the modules include one or more sync pulse modules 118, a timestamp module 120, a stagger module 122, and an aggregation module 124. The modules 118, 120, 122, and 124 may be logic, at least partially comprising hardware logic. In some examples, the modules 118, 120, 122, and 124 may be instructions stored on a storage medium configured to be carried out by a processing device, such as the processor 102. In yet other examples, the modules 118, 120, 122, and 124 may be any combination of hardware, software, and firmware. The modules 118, 120, 122, and 124 may be configured to operate independently, in parallel, distributed, or as a part of a broader process. The modules 118, 120, 122, and 124 may be considered separate modules or sub-modules of a parent module. Additional modules may also be included. In any case, the modules 118, 120, 122, and 124 are configured to carry out operations related to image synchronization with the multi-camera system 112.

The sync pulse modules 118 may be considered separate modules or sub-modules of a parent sync pulse module. In any case, the sync pulse modules 118 are configured to issue sync pulses in a configurable sequence that are specific to each type of heterogeneous image sensor 114. The sync pulses are provided in parallel to each of the sensors, rather than in a daisy-chained, or cascaded manner. More specifically, the sync pulse modules 118, as a whole or individually, may communicate sync pulses to each of the image sensors 114 without first routing the same sync pulse through another image sensor. However, the sync pulses need not be issued simultaneously. As discussed in more detail below, the parallel sync pulses provided to the image sensors 114 from the one or more sync pulse modules 118 may be timed to issue to compensate for different capture delays relative to each image sensor of the image sensors 114 to synchronize resulting image captures to a common frame period.

The timestamp module 120 may be configured to timestamp image captures as they arrive at a processing unit, such as the synchronization unit 116. In some cases, a specific architecture of any given image sensor 114 may result in a difference in time between a time that an image is captured to a time when it is received at the synchronization unit 116. In these scenarios, the timestamp module 120 may be configured to adjust a timestamp to compensate in any difference in arrival of start of frame (SOF) packets having a common frame period.

The stagger module 122 may be configured to introduce an additional delay in issuing a given sync pulse to any one image sensor of the image sensors 114. The introduction of a delay may be useful to capture a higher speed video in relation to the common frame period. The introduced delay may be less than the common frame period. For example, if three image sensors receive sync pulses at one-third intervals of the common frame period, an effective frame rate resulting from overlap of each resulting image capture may be three times the common frame rate.

The aggregation module 124 may be configured to combine multiple image captures from the image sensors 114. The combination may provide multiple points of view and may be useful for a number of possible applications including depth estimation, three-dimensional reconstruction, refocusing, high dynamic range imaging, and the like. The aggregation of streaming images may be based on the timestamps provided by the timestamp module 120 so that corresponding frames from each of the cameras that were acquired can be reliably identified. These aggregated data streams may be provided over a data interface such as Universal Serial Bus (USB), Peripheral Component Interconnect Express (PCIe), Mobile Industry Processor Interface (MIPI), and the like, to an image processing unit such as the processor 102, a graphics processing unit (not shown), or any other suitable means for processing.

In embodiments, the computing device 100 includes a network interface controller 126 component configured to connect the computing device 100 to remote computing devices 128 via a network 130. In some scenarios, the network interface controller 126 is an expansion card configured to be communicatively coupled to a system bus 132. In other scenarios, the network interface controller 126 may be integrated with a motherboard of a computing device, such as the computing device 100. In embodiments, one or more functions of the synchronization unit 116 may be carried out, and/or stored on, a remote computing device, such as one of the remote computing devices 128. For example, images captured can be sent to remote computing devices 130, such as servers having modules of the synchronization unit 116 similar to the modules 118, 120, 122, and 124. Further, in some cases, the resulting aggregated and time-stamped image data may be provided to remote computing devices 128 for further image processing via the network 132.

The computing device 100, as referred to herein, may be a mobile computing device wherein components such as a processing device, a storage device, and a display device are disposed within a single housing. For example, the computing device 100 may be a tablet computer, a smartphone, a handheld videogame system, a cellular phone, an all-in-one slate computing device, or any other computing device having all-in-one functionality wherein the housing of the computing device houses the display was well as components such as storage components and processing components.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through the system bus 132 (e.g., Peripheral Component Interconnect (PCI), Industry Standard Architecture (ISA), HyperTransport®, NuBus, USB, PCIe, MIPI, etc.) to components including the memory 106 and the storage device 104.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
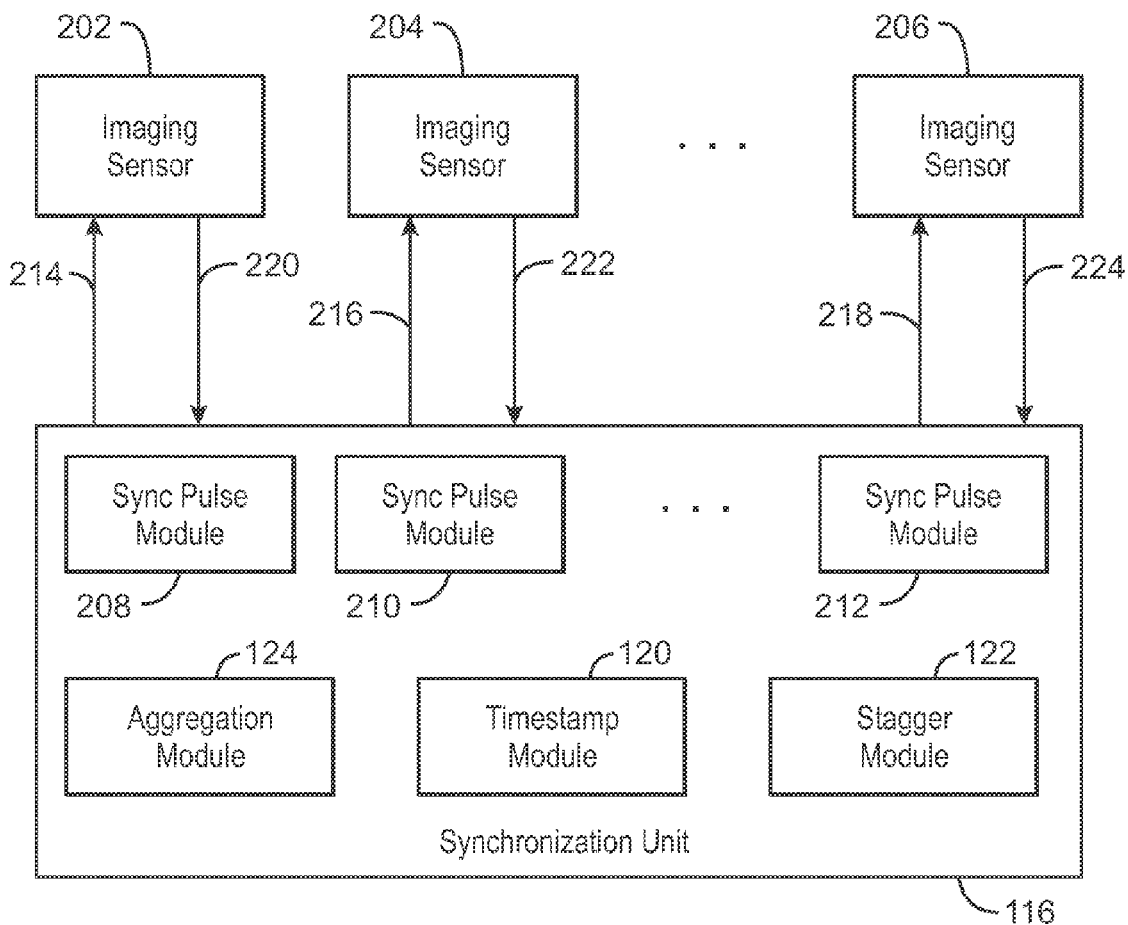
FIG. 2 is block diagram illustrating synchronization using sync pulses performed at the computing device.

FIG. 2 is block diagram illustrating synchronization using sync pulses performed at the computing device. In FIG. 2, the imaging sensors 114 of FIG. 1 are separated into imaging sensor 202, imaging sensor 204, and imaging sensor 206. Any number of additional imaging sensors is contemplated. The sync pulse modules 118 of FIG. 1 are illustrated in FIG. 2 as sync pulse module 208, sync pulse module 210, and sync pulse module 212. For ease of understanding, the sync pulse modules 208, 210, and 212 are illustrated as being separate modules. However, as discussed above in regard to FIG. 1, the sync pulse modules 208, 210, and 212 may be separate modules or combined into a single sync pulse module configured to carry out the operations of the sync pulse modules 208, 210, and 212.

As illustrated in FIG. 2, a synchronization module, such as the synchronization module 116 of FIG. 1 may issue sync pulses to each imaging sensor in an array of heterogeneous imaging sensors using parallel links. The operations of the sync pulse modules 208, 210, 212 may include issuing a sync pulse, as indicated at 214, 216, and 218, after a blanking period to synchronize the end of each integration period of each imaging sensor 202, 204, and 206 with one another. As discussed in more detail below in regard to FIG. 3, a pulse offset is a period of time that is configured to synchronize image capture to a common frame period by compensating for differences in capture delay. In some cases, image capture may synchronize with any other image capture to an accuracy of approximately 10 microseconds. Once the capture delay and sensor processing periods are over, each of the imaging sensors 202, 204, and 206 may provide a SOF packet back to the synchronization unit 116, as indicated at 220, 222, and 224.

As discussed above, a time period to receive the SOF packets from each of the imaging sensors 202, 204, and 206 may depend on characteristics, such as architecture, of any given imaging sensor. Therefore, the timestamp module 120 may be configured to adjust a timestamp for multiple images associated with a given frame period to compensate for any differences in delay. Once the timestamps have been adjusted, the aggregation module 124 may be configured to combine the images associated with a given frame period, or images in the case of video.

Figure 3:
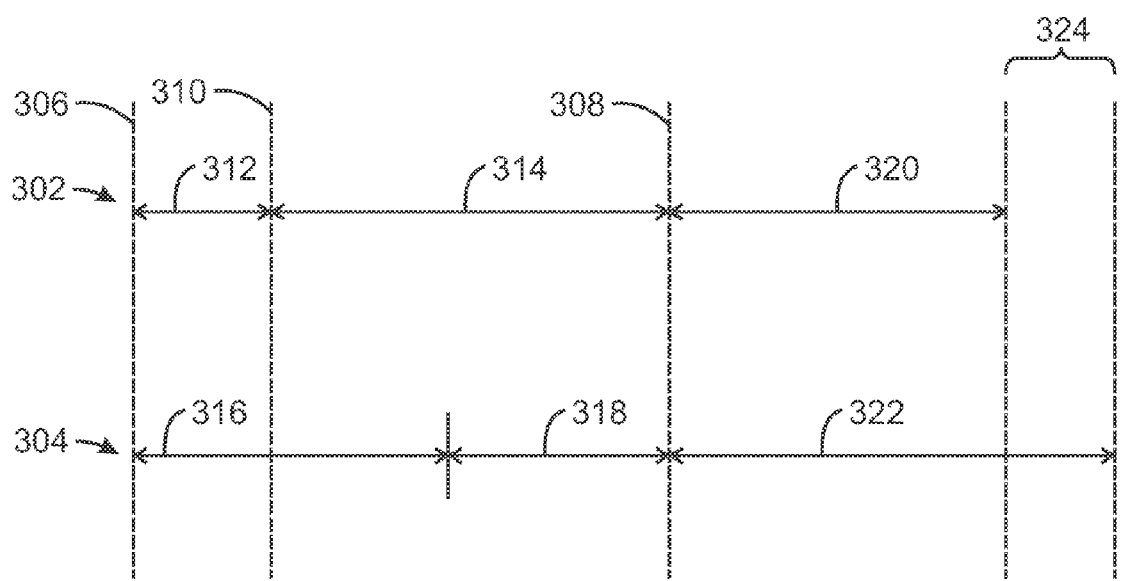
FIG. 3 illustrates a timeline for image capture synchronization for a multi-camera system.

FIG. 3 illustrates a timeline for image capture synchronization for a multi-camera system. The first time line 302 may be associated with a first imaging sensor, such as the imaging sensor 202 of FIG. 2. The second time line 304 may be associated with a second imaging sensor, such as the imaging sensor 204 of FIG. 2. A synchronization request is indicated at 306, while an image capture is indicated at 308. Before issuing a sync pulse on the first imaging sensor at 310, a sync pulse offset period occurs, as indicated at 312. Once the sync pulse is issued at 310, the capture delay, occurs at 314, and ends image capture at 308.

For the second time line, a capture delay 318 may be shorter than the capture delay 314 of the first imaging sensor. Therefore, a sync pulse offset period 316 associated with the second time line 304 may be longer than the sync pulse offset period 312 of the first time line 302. In other words, the sync pulse offset periods 312 and 316 may be configured to ensure that the capture delay periods 314 and 318 end at the image capture time, as indicated by the dashed line 308. The technique of using configurable sync pulse offset periods is useful for synchronizing image capture from multiple imaging sensors. As another way of phrasing, image captures from the first and second imaging sensors are synchronized when the first sync pulse offset period 312 plus the capture delay period 314 of the first imaging sensor is approximately equal to the second sync pulse offset period 316 plus a capture delay period 318 of the second imaging sensor. In embodiments, approximately equal may be within a range associated with clock precision on the sensor.

Further, as discussed above, a delay may occur between image capture and the SOF packet provided from an imaging sensor back to the synchronization unit 116. This is the sensor processing period, as indicated at 320 and 322 in FIG. 3. A difference in the delays 324 may be compensated for in a resulting timestamp, as discussed above.

Figure 4:
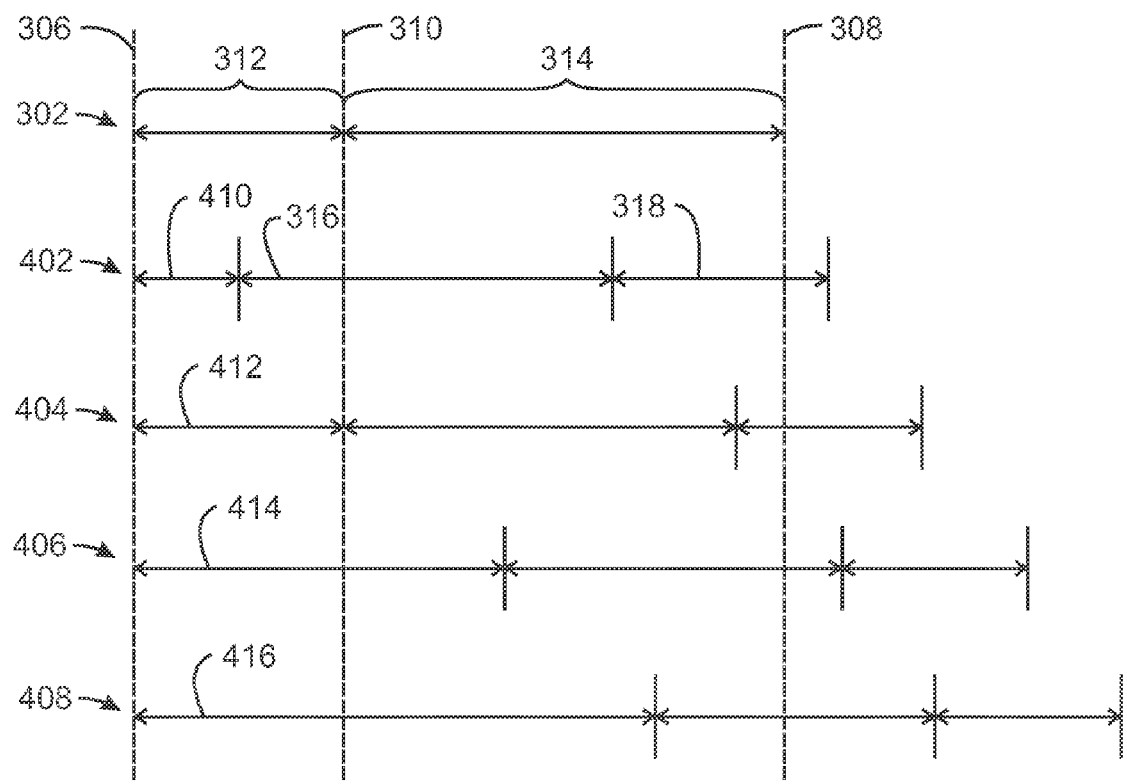
FIG. 4 illustrates a timeline for image capture synchronization for a multi-camera system using staggering.

FIG. 4 illustrates a timeline for image capture synchronization for a multi-camera system using staggering. As discussed above in regard to FIG. 1 and FIG. 2, in some cases, a delay may be introduced to capture higher speed video. The delay may be in addition to, or aside from the delay introduced by the sync pulse offset periods, such as the sync pulse offset periods 312 and 316 of FIG. 3.

In FIG. 4, a first time line, such as the first time line 302 of FIG. 3, may be associated with a first imaging sensor, such as the imaging sensor 202 of FIG. 2. In this timeline four additional timelines represent staggered image capture of four additional imaging sensors, including timelines 402, 404, 406, and 408. As illustrated, the time line 402 introduces an additional delay 410 in addition to the sync pulse offset period 316, and the capture delay 318. Likewise, the time lines 404, 406, and 408, also introduce increasingly larger delays as indicated by 412, 414, and 416, respectively. In this scenario, the scene effectively has 5 captures, and an effective frame rate may be 5 times the frame rate that would otherwise occur. Subsequent frames may continue to overlap with the staggered time lines 402, 404, 406, and 408 each respectively associated with an imaging sensor. This staggered frame rate may be useful in capturing high speed video from multiple perspectives.

Figure 5:
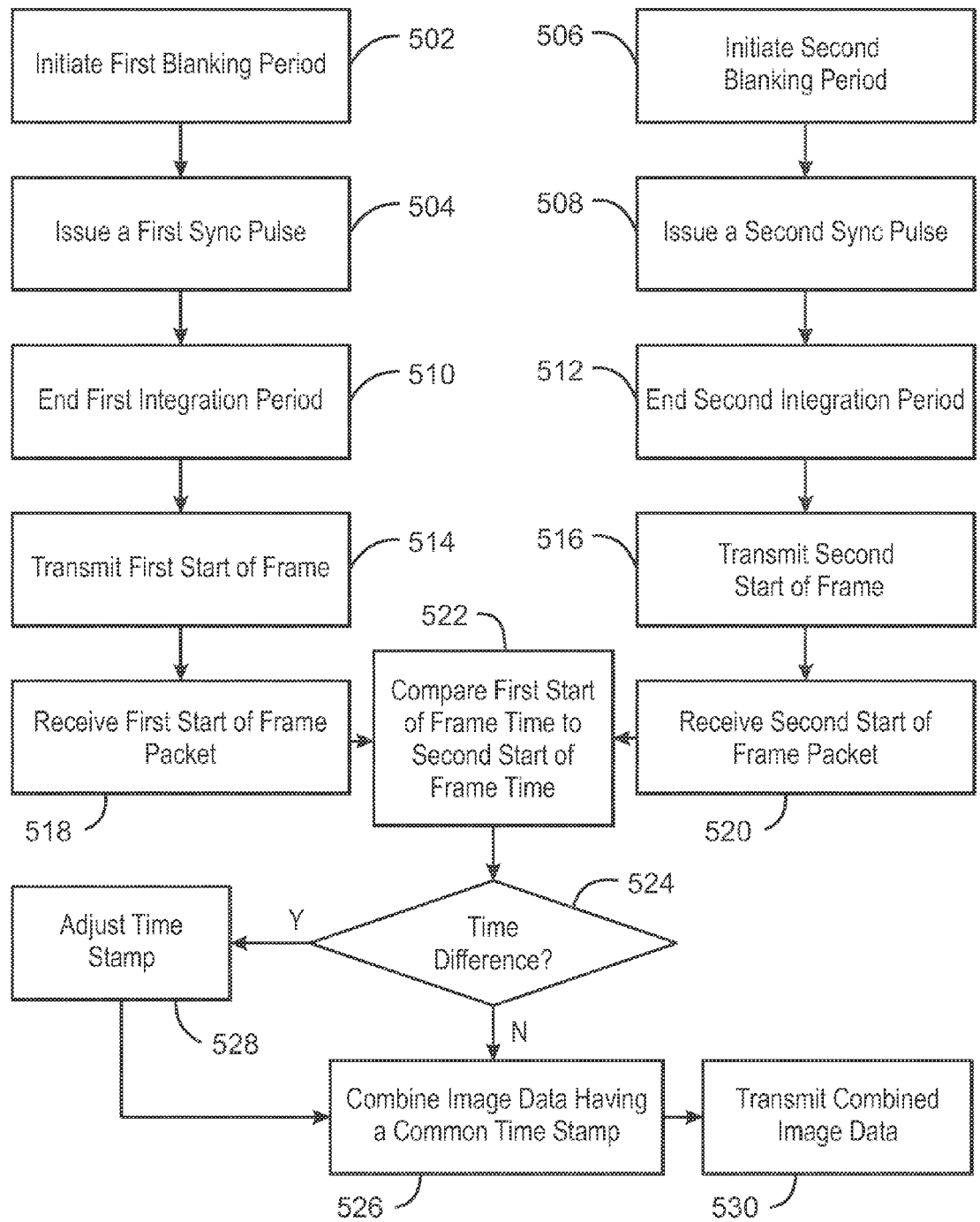
FIG. 5 is a block diagram illustrating an exemplary method for generating synchronization in a multi-camera system when image capture is substantially simultaneous, but sensor processing period differences result in frames arriving at the synchronization unit at different times.

FIG. 5 is a block diagram illustrating an exemplary method for generating synchronization in a multi-camera system when image capture is substantially simultaneous, but sensor processing period differences result in frames arriving at the synchronization unit 116 at different times. In FIG. 5, a method is illustrated for a multi-camera system including two imaging sensors. However, additional sensors can be added to the method in the same manner.

For a first imaging sensor a first sync pulse offset period is initiated at block 502. At 504, once the first sync pulse offset period is initiated, a first sync pulse is issued.

For a second imaging sensor a second sync pulse offset period is initiated at block 506. At block 508, a second sync pulse is issued after the second sync pulse offset period. The first sync pulse issued at 504 and the second sync pulse 506 will trigger a capture delay period at each of the associated imaging sensors. At blocks 510 and 512, image capture occurs. In the techniques described herein, the sync pulse offset periods initiated at 502 and 506 may be configured such that the capture delay periods ending at 510 and 512 occur within a specified range of time with respect to each other. For example, the specified range may be within 10 microseconds of each other.

At block 514 a first SOF is transmitted from the first imaging sensor, and at 516, a second SOF is transmitted from the second imaging sensor. At 518 the first SOF is received at a processing unit, such as the synchronization unit 116 of FIG. 1 and FIG. 2. Similarly, the second SOF may be received at the synchronization unit 116 as indicated at block 520.

As discussed above in regard to FIG. 1 and FIG. 3, a time period between block 510 and block 518 may differ from a time period between 512 and 520 depending on characteristics of each imaging sensor, such as a given sensors architecture. Therefore, at block 522, the first SOF time of receipt is compared to the second SOF time of receipt. At block 524, a determination is made as to whether there is a time difference between the first SOF time of receipt and the second SOF time of receipt. If not, the image data may be combined having a common time stamp as indicated at 526. If there is a time difference determined at 524, a timestamp is adjusted to compensate for the time difference at block 528, and the image data is combined having a common timestamp at block 526. Once the image data has been combined, the combined image data is transmitted for further image processing at 530.

The method illustrated in FIG. 5 may also include staggering image as discussed above in regard to FIG. 4. Staggering may be implemented by modifying the sync pulse delay before issuing a sync pulse. The delay can be a period that is less than the common frame period for multiple imaging sensors. In this scenario where image staggering is implemented, the remainder of the method illustrated in FIG. 5 applies, except that the time difference check at 524 is looking for an expected time difference based on the staggering instead of no time difference.

Figure 6:
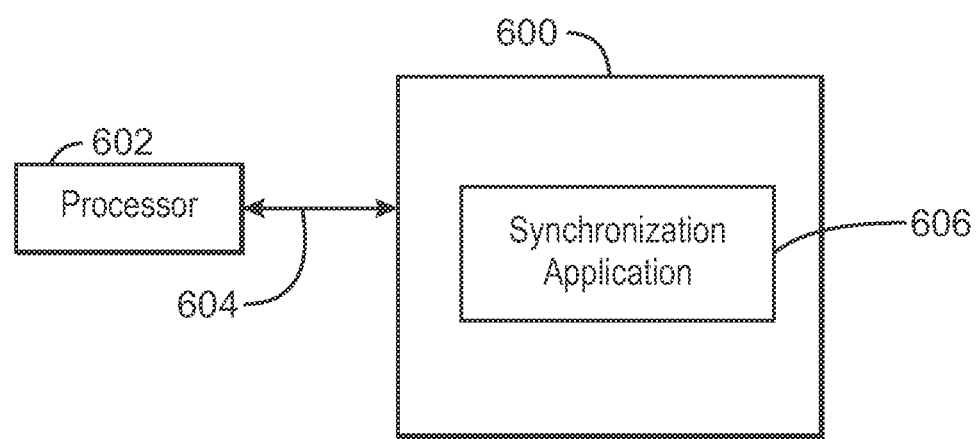
FIG. 6 is a block diagram depicting an example of a computer-readable medium configured to calibrate image capturing devices.

FIG. 6 is a block diagram depicting an example of a computer-readable medium configured to calibrate image capturing devices. The computer-readable medium 600 may be accessed by a processor 600 over a computer bus 604. In some examples, the computer-readable medium 600 may be a non-transitory computer-readable medium. In some examples, the computer-readable medium may be a storage medium, but not including carrier waves, signals, and the like. Furthermore, the computer-readable medium 600 may include computer-executable instructions to direct the processor 602 to perform the steps of the current method.

The various software components discussed herein may be stored on the tangible, non-transitory, computer-readable medium 600, as indicated in FIG. 6. For example, an synchronization application 606 may be configured to issue a first sync pulse after a first blanking period to a first imaging sensor, and issue a second sync pulse parallel to the first sync pulse after a second blanking period to a second imaging sensor, wherein the first blanking period and the second blanking period occur within a common frame period.

Examples may include subject matter such as a method, means for performing acts of the method, at least one machine-readable medium including instructions that, when performed by a machine cause the machine to performs acts of the method, or of an apparatus or system for projecting a virtual image according to embodiments and examples described herein.

Example 1 is a device for image synchronization, comprising logic, at least partially including hardware logic to implement modules including: a first sync pulse module to issue a first sync pulse after a first sync pulse offset period to a first imaging sensor, and a second sync pulse module to issue a second sync pulse parallel to the first sync pulse after a second sync pulse offset period to a second imaging sensor.

Example 2 includes the device of example 1. In this example durations of each of the first and second sync pulse offset periods are based on unique capture delay periods of each of the imaging sensors.

Example 3 includes the device of any combination of examples 1-2. In this example image captures from the first and second imaging sensors are synchronized when the first sync pulse offset period plus a capture delay period of the first imaging sensor is approximately equal to the second sync pulse offset period plus a capture delay period of the second imaging sensor.

Example 4 includes the device of any combination of examples 1-3. The imaging sensors may include a heterogeneous configuration, and wherein the unique capture delay periods are based on characteristics of the heterogeneous imaging sensor configuration.

Example 5 includes the device of any combination of examples 1-4. The heterogeneous characteristics may include at least heterogeneous resolutions of each imaging sensor within respect to each other.

Example 6 includes the device of any combination of examples 1-5. This example includes a timestamp module configured to timestamp a plurality of image data associated with the common frame period as it is received at the device from each of the imaging sensors.

Example 7 includes the device of any combination of examples 1-6. The timestamp module is further configured to adjust the timestamp to compensate for a delay associated with receiving image data from at least one of the imaging sensors at the device.

Example 8 includes the device of any combination of examples 1-7. This example includes a staggering module configured to introduce an additional sync pulse delay before issuing the second sync pulse offset period. The additional sync pulse delay may include a period that is less than the common frame period.

Example 9 includes the device of any combination of examples 1-8. This example includes an aggregation module configured to overlap image data received from the first imaging sensor and staggered image data received from the second imaging sensor to increase a rate of image data capture per frame.

Example 10 includes the device of any combination of examples 1-9. The first and second sync pulses are issued to a general purpose input output (GPIO) pin of each of the first and second imaging sensors.

Example 11 is a method for image synchronization. The wireless charging device may include issuing a first sync pulse after a first sync pulse offset period to a first imaging sensor, and issuing a second sync pulse parallel to the first sync pulse after a second sync pulse offset period to a second imaging sensor.

Example 12 includes the method of example 11. In this example durations of each of the first and second sync offset periods are based on unique capture delay periods of each of the imaging sensors.

Example 13 includes the method of any combination of examples 11-12. This example includes determining synchronization. In this example image captures from the first and second imaging sensors are synchronized when the first sync pulse offset period plus a capture delay period of the first imaging sensor is approximately equal to the second sync pulse time plus a capture delay period of the second imaging sensor.

Example 14 includes the method of any combination of examples 11-13. The imaging sensors are heterogeneous, and wherein the unique capture delay periods are based on heterogeneous characteristics of each imaging sensor.

Example 15 includes the method of any combination of examples 11-14. The heterogeneous characteristics may include at least heterogeneous resolutions of each imaging sensor with respect to each other.

Example 16 includes the method of any combination of examples 11-15. This example includes timestamping a plurality of image data associated with the common frame period as it is received at the device from each of the imaging sensors.

Example 17 includes the method of any combination of examples 11-16. This example includes adjusting the timestamp to compensate for a delay associated with receiving image data from at least one of the imaging sensors at the device.

Example 18 includes the method of any combination of examples 11-17. This example includes staggering image capture by introducing an additional sync pulse delay before issuing the second sync pulse offset period. The additional sync pulse delay may include a period that is less than the common frame period.

Example 19 includes the method of any combination of examples 11-18. This example includes overlapping image data received from the first imaging sensor and staggered image data received from the second imaging sensor to increase a rate of image data capture per frame.

Example 20 includes the method of any combination of examples 11-19. The first and second sync pulses are issued to a general purpose input output (GPIO) pin of each of the first and second imaging sensors.

Example 21 is a computer readable medium including code, when executed, to cause a processing device to: issue a first sync pulse after a first sync pulse offset period to a first imaging sensor, and issue a second sync pulse parallel to the first sync pulse after a second sync pulse offset period to a second imaging sensor Example 22 includes the computer readable medium of example 21. In this example durations of each of the first and second sync pulse offset periods are based on unique capture delay periods of each of the imaging sensors.

Example 23 includes the computer readable medium of any combination of examples 21-22. In this example image captures from the first and second imaging sensors are synchronized when the first sync pulse offset time plus a capture delay period of the first imaging sensor is approximately equal to the second sync pulse offset time plus a capture delay period of the second imaging sensor.

Example 24 includes the computer readable medium of any combination of examples 21-23. The imaging sensors are heterogeneous, and wherein the unique capture delay periods are based on heterogeneous characteristics of each imaging sensor.

Example 25 includes the computer readable medium of any combination of examples 21-24. The heterogeneous characteristics may include at least heterogeneous resolutions of each imaging sensor with respect to each other.

Example 26 includes the computer readable medium of any combination of examples 21-25. This example includes code, when executed, to cause the processing device to timestamp a plurality of image data associated with the common frame period as it is received at the device from each of the imaging sensors.

Example 27 includes the computer readable medium of any combination of examples 21-26. This example includes code, when executed, to cause the processing device to adjust the timestamp to compensate for a delay associated with receiving image data from at least one of the imaging sensors at the device.

Example 28 includes the computer readable medium of any combination of examples 21-27. This example includes code, when executed, to cause the processing device to introduce an additional sync pulse delay before issuing the second sync pulse offset period. The additional sync pulse delay may include a period that is less than the common frame period.

Example 29 includes the computer readable medium of any combination of examples 21-28. This example includes code, when executed, to cause the processing device to overlap image data received from the first imaging sensor and staggered image data received from the second imaging sensor to increase a rate of image data capture per frame.

Example 30 includes the computer readable medium of any combination of examples 21-29. The first and second sync pulses are issued to a general purpose input output (GPIO) pin of each of the first and second imaging sensors.

Example 31 is a method for image synchronization. The wireless charging device may include issuing a first sync pulse after a first sync pulse offset period to a first means for image sensing, and issuing a second sync pulse parallel to the first sync pulse after a second sync pulse offset period to a second means for image sensing.

Example 32 includes the method of example 31. In this example durations of each of the first and second sync offset periods are based on unique capture delay periods of each of the means for image sensing.

Example 33 includes the method of any combination of examples 31-32. This example includes determining synchronization. In this example image captures from the first and second means for image sensing are synchronized when the first sync pulse offset period plus a capture delay period of the first means for image sensing is approximately equal to the second sync pulse time plus a capture delay period of the second means for image sensing.

Example 34 includes the method of any combination of examples 31-33. The means for image sensing are heterogeneous, and wherein the unique capture delay periods are based on heterogeneous characteristics of each means for image sensing.

Example 35 includes the method of any combination of examples 31-34. The heterogeneous characteristics may include at least heterogeneous resolutions of each means for image sensing with respect to each other.

Example 36 includes the method of any combination of examples 31-35. This example includes timestamping a plurality of image data associated with the common frame period as it is received at the device from each of the means for image sensing.

Example 37 includes the method of any combination of examples 31-36. This example includes adjusting the timestamp to compensate for a delay associated with receiving image data from at least one of the means for image sensing at the device.

Example 38 includes the method of any combination of examples 31-37. This example includes staggering image capture by introducing an additional sync pulse delay before issuing the second sync pulse offset period. The additional sync pulse delay may include a period that is less than the common frame period.

Example 39 includes the method of any combination of examples 31-38. This example includes overlapping image data received from the first means for image sensing and staggered image data received from the second means for image sensing to increase a rate of image data capture per frame.

Example 40 includes the method of any combination of examples 31-39. The first and second sync pulses are issued to a general purpose input output (GPIO) pin of each of the first and second means for image sensing.

Example 41 is a device for image synchronization, including logic, at least partially including hardware logic to implement modules including: a first sync pulse module to issue a first sync pulse after a first sync pulse offset period to a first means for image sensing, and a second sync pulse module to issue a second sync pulse parallel to the first sync pulse after a second sync pulse offset period to a second means for image sensing.

Example 42 includes the device of example 41. In this example durations of each of the first and second sync pulse offset periods are based on unique capture delay periods of each of the means for image sensing.

Example 43 includes the device of any combination of examples 41-42. In this example image captures from the first and second means for image sensing are synchronized when the first sync pulse offset period plus a capture delay period of the first means for image sensing is approximately equal to the second sync pulse offset period plus a capture delay period of the second means for image sensing.

Example 44 includes the device of any combination of examples 41-43. The means for image sensing may include a heterogeneous configuration, and wherein the unique capture delay periods are based on characteristics of the heterogeneous means for image sensing configuration.

Example 45 includes the device of any combination of examples 41-44. This example includes a timestamp module configured to timestamp a plurality of image data associated with the common frame period as it is received at the device from each of the means for image sensing.

Example 46 includes the device of any combination of examples 41-45. The timestamp module is further configured to adjust the timestamp to compensate for a delay associated with receiving image data from at least one of the means for image sensing at the device.

Example 47 includes the device of any combination of examples 41-46. This example includes a staggering module configured to introduce an additional sync pulse delay before issuing the second sync pulse offset period. The additional sync pulse delay may include a period that is less than the common frame period.

Example 48 includes the device of any combination of examples 41-47. This example includes an aggregation module configured to overlap image data received from the first means for image sensing and staggered image data received from the second means for image sensing to increase a rate of image data capture per frame.

Example 49 includes the device of any combination of examples 41-48. The first and second sync pulses are issued to a general purpose input output (GPIO) pin of each of the first and second means for image sensing.

Example 50 is a machine-readable storage including machine-readable instructions, when executed, to implement a method or realize a device as claimed in any preceding claim.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A device for image synchronization, comprising logic, at least partially comprising hardware logic to implement modules comprising:
    a first sync pulse module to issue a first sync pulse after a first sync pulse offset period to a first imaging sensor;
    a second sync pulse module to issue a second sync pulse parallel to the first sync pulse after a second sync pulse offset period to a second imaging sensor;
    a staggering module to introduce an additional delay in issuing the second sync pulse offset period, wherein the additional delay is less than a common frame period;
    an aggregation module to overlap image data received from the first imaging sensor and staggered image data received from the second imaging sensor to increase a rate of image data capture per frame; and
    a timestamp module to:
        timestamp first image data received from the first imaging sensor and second image data received from the second imaging sensor;
        compare a first start of frame (SOF) time of receipt to a second SOF time of receipt; and
        adjust a timestamp of the second image data in response to a difference between the first SOF time of receipt and the second SOF time of receipt, wherein the first image data is combined with the second image data, and wherein a combination of the first and second image data has a common timestamp.

2. The device of claim 1, wherein durations of each of the first and second sync pulse offset periods are based on unique capture delay periods of each of the imaging sensors.

3. The device of claim 2, wherein image captures from the first and second imaging sensors are synchronized when the first sync pulse offset period plus a capture delay period of the first imaging sensor is approximately equal to the second sync pulse offset period plus a capture delay period of the second imaging sensor.

4. The device of claim 2, wherein the imaging sensors comprise a heterogeneous configuration, and wherein the unique capture delay periods are based on characteristics of the heterogeneous imaging sensor configuration.

5. The device of claim 4, wherein the heterogeneous characteristics comprise at least heterogeneous resolutions of each imaging sensor within respect to each other.

6. The device of claim 1, wherein the timestamp module is configured to timestamp a plurality of image data associated with the common frame period as it is received at the device from each of the imaging sensors.

7. The device of claim 6, wherein the timestamp module is further configured to adjust the timestamp to compensate for a delay associated with receiving image data from at least one of the imaging sensors at the device.

8. The device of claim 1, wherein the first and second sync pulses are issued to a general purpose input output (GPIO) pin of each of the first and second imaging sensors.

9. A method for image synchronization, comprising:
issuing a first sync pulse after a first sync pulse offset period to a first imaging sensor;
issuing a second sync pulse parallel to the first sync pulse after a second sync pulse offset period to a second imaging sensor;
staggering image capture by introducing an additional delay in issuing the second sync pulse offset period, wherein the additional delay is less than a common frame period;
overlapping image data received from the first imaging sensor and staggered image data received from the second imaging sensor to increase a rate of image data capture per frame;
timestamping first image data received from the first imaging sensor and second image data received from the second imaging sensor;
comparing a first start of frame (SOF) time of receipt to a second SOF time of receipt; and
adjusting a timestamp of the second image data in response to a difference between the first SOF time of receipt and the second SOF time of receipt, wherein the first image data is combined with the second image data, and wherein a combination of the first and second image data has a common timestamp.

10. The method of claim 9, wherein durations of each of the first and second sync pulse offset periods are based on unique capture delay periods of each of the imaging sensors.

11. The method of claim 10, further comprising determining synchronization, wherein image captures from the first and second imaging sensors are synchronized when the first sync pulse offset period plus a capture delay period of the first imaging sensor is approximately equal to the second sync pulse offset period plus a capture delay period of the second imaging sensor.

12. The method of claim 10, wherein the imaging sensors are heterogeneous, and wherein the unique capture delay periods are based on heterogeneous characteristics of each imaging sensor.

13. The method of claim 12, wherein the heterogeneous characteristics comprise at least heterogeneous resolutions of each imaging sensor with respect to each other.

14. The method of claim 9, further comprising timestamping a plurality of image data associated with the common frame period as it is received at the device from each of the imaging sensors.

15. The method of claim 14, further comprising adjusting the timestamp to compensate for a delay associated with receiving image data from at least one of the imaging sensors at the device.

16. The method of claim 9, wherein the first and second sync pulses are issued to a general purpose input output (GPIO) pin of each of the first and second imaging sensors.

17. A non-transitory, computer readable medium including code, when executed, to cause a processing device to:
issue a first sync pulse after a first sync pulse offset period to a first imaging sensor;
issue a second sync pulse parallel to the first sync pulse after a second sync pulse offset period to a second imaging sensor;
stagger image capture by introducing an additional delay in issuing the second sync pulse offset period, wherein the additional delay is less than a common frame period;
overlap image data received from the first imaging sensor and staggered image data received from the second imaging sensor to increase a rate of image data capture per frame;
timestamp first image data received from the first imaging sensor and second image data received from the second imaging sensor;
compare a first start of frame (SOF) time of receipt to a second SOF time of receipt; and
adjust a timestamp of the second image data in response to a difference between the first SOF time of receipt and the second SOF time of receipt, wherein the first image data is combined with the second image data, and wherein a combination of the first and second image data has a common timestamp.

18. The non-transitory, computer readable medium of claim 17, wherein durations of each of the first and second sync pulse offset periods are based on unique capture delay periods of each of the imaging sensors.

19. The non-transitory, computer readable medium of claim 18, wherein image captures from the first and second imaging sensors are synchronized when the first sync pulse offset period plus a capture delay period of the first imaging sensor is approximately equal to the second sync pulse offset period plus a capture delay period of the second imaging sensor, and wherein the imaging sensors are heterogeneous, and wherein the unique capture delay periods are based on heterogeneous characteristics of each imaging sensor.

20. The non-transitory, computer readable medium of claim 17, further comprising code, when executed, to cause the processing device to:
timestamp a plurality of image data associated with the common frame period as it is received at the device from each of the imaging sensors; and
adjust the timestamp to compensate for a delay associated with receiving image data from at least one of the imaging sensors at the device.

* * * * *